US008102937B2

(12) United States Patent
Helfenstein et al.

(10) Patent No.: US 8,102,937 B2
(45) Date of Patent: Jan. 24, 2012

(54) ENHANCED BIT MAPPING FOR DIGITAL INTERFACE OF A WIRELESS COMMUNICATION EQUIPMENT IN MULTI-TIME SLOT AND MULTI-MODE OPERATION (75) Inventors: Markus Helfenstein, Lucerne (CH); Harald Bauer, Nurenberg (DE); Peter Bode, Nurenberg (DE); Rainer Dietsch, Heroldsberg (DE)

(73) Assignee: ST-Ericsson SA, Plan-les-Ouates (CH)

( * ) Notice: Subject to any disclaimer, the term of this patent is extended or adjusted under 35 U.S.C. 154(b) by 872 days.

(21) Appl. No.: 11/572,911

(22) PCT Filed: Jul. 12, 2005

(86) PCT No.: PCT/IB2005/052312
§ 371 (c)(1),
(2), (4) Date: Jan. 29, 2007

(87) PCT Pub. No.: WO2006/013484
PCT Pub. Date: Feb. 9, 2006

(65) Prior Publication Data
US 2008/0095248 A1 Apr. 24, 2008

(30) Foreign Application Priority Data

Jul. 29, 2004 (EP) ..................................... 04300496

(51) Int. Cl.
*H04L 27/00* (2006.01)
(52) U.S. Cl. .......... 375/295; 327/291; 332/106; 341/20; 341/173
(58) Field of Classification Search .................. 375/295; 327/291; 332/106; 341/20, 173
See application file for complete search history.

(56) References Cited

U.S. PATENT DOCUMENTS

| 5,375,145 A | * | 12/1994 | Abbott et al. | 375/345 |
| 5,396,239 A | * | 3/1995 | McMahon et al. | 341/58 |
| 5,937,001 A | * | 8/1999 | Shockey | 375/142 |
| 6,603,822 B2 | * | 8/2003 | Brede et al. | 375/340 |

(Continued)

FOREIGN PATENT DOCUMENTS

WO WO2004021659 A 3/2004

(Continued)

OTHER PUBLICATIONS

Laurent, P., "Exact and Approximate Construction of Digital Phase Modulations by Superposition of Amplitude Pulses (AMP)," IEEE Transactions on Communications, COM-34(2):150-160, Feb. 1986.

(Continued)

*Primary Examiner* — David C. Payne
*Assistant Examiner* — Erin File
(74) *Attorney, Agent, or Firm* — Potomac Patent Group PLLC (57) ABSTRACT A controller is configured to determine a word in a set of words corresponding to a received coding value, the set of words including at least one data word, at least one modulator command word and at least one gain command word. When the received coding value corresponds to a data word, the controller causes the data word to be modulated. When the received coding value corresponds to a modulator command word, the controller controls a modulator based on the modulator command word. When the received coding value corresponds to a gain command word, the controller controls a gain based on the gain command word.

23 Claims, 4 Drawing Sheets

U.S. PATENT DOCUMENTS

| | | |
|---|---|---|
| 6,724,829 B1 | 4/2004 | Tzukerman et al. |
| 7,062,703 B1 * | 6/2006 | Keaney et al. ............... 714/807 |
| 7,075,906 B2 * | 7/2006 | Douglas et al. ............... 370/328 |
| 7,212,798 B1 * | 5/2007 | Adams et al. ............... 455/251.1 |
| 7,239,678 B2 * | 7/2007 | Rahman ....................... 375/345 |
| 7,310,522 B2 * | 12/2007 | Geile ............................ 455/424 |
| 7,324,590 B2 * | 1/2008 | Abrishamkar et al. ....... 375/233 |
| 7,415,661 B2 * | 8/2008 | Keaney et al. ............... 714/807 |
| 7,477,696 B2 * | 1/2009 | Ferreol et al. ............... 375/267 |
| 2003/0133423 A1 * | 7/2003 | LaDue ......................... 370/330 |
| 2003/0141936 A1 * | 7/2003 | Staszewski et al. ............ 331/16 |
| 2004/0127207 A1 * | 7/2004 | Stufflet et al. ................ 455/418 |
| 2005/0040909 A1 * | 2/2005 | Waight et al. ............... 333/17.1 |
| 2005/0088998 A1 * | 4/2005 | Douglas et al. ............... 370/338 |
| 2005/0249312 A1 * | 11/2005 | Bode et al. ................... 375/308 |
| 2006/0173305 A1 * | 8/2006 | Asafusa et al. ............... 600/437 |
| 2006/0193277 A1 * | 8/2006 | Keaney et al. ............... 370/310 |
| 2008/0273536 A1 * | 11/2008 | Keaney et al. ............... 370/392 |

FOREIGN PATENT DOCUMENTS

| | | |
|---|---|---|
| WO | WO2004025870 A1 | 3/2004 |
| WO | 2004/030228 | 4/2004 |
| WO | 2004/034667 | 4/2004 |
| WO | 2004030228 A2 | 4/2004 |
| WO | 2004034667 A2 | 4/2004 |

OTHER PUBLICATIONS

Jung, P., "Laurent's Representation of Binary Digital Continuous Phase Modulated Signals with Modulation Index 1/2 Revisited," IEEE Transactions on Communications, 42(2/3/4):221-224, Feb./Mar./Apr. 1994.

3GPP TS 05.04 v8.4.0 (Nov. 2001) Technical Specification, 2001, 10 pages.

Fogg, A. "DigRF Baseband/RF Digital Interface Specification," Digital Interface Working Group, Feb. 20, 2004, 32 pages.

* cited by examiner

ENHANCED BIT MAPPING FOR DIGITAL INTERFACE OF A WIRELESS COMMUNICATION EQUIPMENT IN MULTI-TIME SLOT AND MULTI-MODE OPERATION

BACKGROUND OF THE INVENTION

1. Field of the Invention

The present invention relates to the digital baseband transmission path of the wireless communication equipments, and more precisely to the control of the modulator and/or the gain controller of such equipments, through a digital interface.

2. Description of the Related Art

In certain communication networks, such as GSM (Global System for Mobile communications), it has been proposed to enhance the data rate through new standards, such as the so-called EGPRS standard (Enhanced General Packet Radio Service). For instance the EGPRS standard has introduced in the GSM network a new modulation scheme, named 8PSK (8 Phase Shift Keying), to improve the data rate previously offered by the GMSK (Gaussian Minimum Shift Keying) modulation scheme.

For flexibility purpose of data transmission, the EGPRS standard defines a multi-time slot (or multislot) and multi-mode operation requiring that more than one time slot out of the eight time slots dividing a GSM frame could be used for data transmission with GMSK or 8PSK modulation. So, the EGPRS wireless communication equipments must comprise a modulator able to switch easily from a GMSK modulation scheme to an 8PSK modulation scheme and vice versa in consecutive time slots.

But, as it is known by one skilled in the art, GMSK is a constant envelope modulation scheme which allows the use of a saturated power amplification with high efficiency, while 8PSK is a modulation scheme which delivers a modulated carrier that varies not only in phase but also in amplitude and therefore can not allow the use of a saturated power amplification but for instance a linear one.

So, in multislot operation the modulation scheme changes but also possibly the power amplification mode, which unfortunately introduces interferences between the adjacent channels associated to consecutive time slots.

In order to reduce these interferences it has been proposed to ramp down the transmit power by means of the gain controller of a power amplifier and to change the modulator and/or the power amplification mode during a guard period provided between the consecutive time slots. It is recalled that the guard period is a time interval dedicated to control and/or switching operation without data transmission.

An alternative to this solution has been notably described in the patent document WO 2004/021659. It consists of a joint GMSK/8PSK I/Q modulator adapted to power ramping by means of I/Q signal shaping (where I and Q are respectively in-phase and quadrature components), without changing neither the power amplification mode nor the modulators. This is done by feeding with zeros the joint GMSK/8PSK I/Q modulator, thereby allowing control of the power of the I/Q signals.

If an external power control loop is used it is required that the modulator function be decoupled from the power control loop, or in other words that the ramping of the power amplifier be not determined by the modulator behaviour, but strictly by the power control loop. This stringent condition requires that the modulator output signal has an instantaneous transition between on/off states (data mode versus forced-zero mode) rather than a smooth one. Such transitions require that the modulation switching as well as the gain changes be timed accurately.

An industrial standard has been proposed to standardize the interfaces between the digital baseband processor (or device), the baseband interface (or BAI) and the radiofrequency (RF) device (which is connected to a power amplifier (or PA)).

It is recalled that, for the transmit direction, the digital baseband processor mainly comprises a digital signal processor (DSP) and a controller device (e.g., ARM) interfacing to the BAI, the baseband interface (or BAI) mainly comprises the modulator, a gain controller, a digital to analog converter (or DAC) and a postfilter interfacing to the radiofrequency (RF) device, and the RF device mainly comprises filters, gain stages and mixers. The digital baseband processor (or device), the baseband interface (or BAI), the radiofrequency (RF) device and the power amplifier (or PA) define what is named the transmission path of a wireless communication equipments.

The digital baseband processor, the BAI and the RF device may be defined on a same chip, or on separate chips, and any combination of two of these three devices may be also defined on a same chip. So, they may be connected one to the other in a "chip-to-chip connection mode" or in a "block-to-block connection mode" (when they are integrated on a same chip). But whatever the connection mode they need to be interfaced through a digital interface.

The industrial standard defines a digital interface, named "digital RF interface" and capable of running a protocol named "digRF", and a control device to facilitate the data transmission between the baseband device and the baseband interface (or BAI). This is done by means of a coding table stored in the control device and establishing a correspondence between symbols for the radiofrequency device and coding values to transmit to this radiofrequency device through the digital interface.

For instance in the case of a GMSK/8PSK I/Q modulators the coding table comprises 16 symbols, two corresponding to data words for feeding the GMSK I/Q modulator, eight corresponding to data words for feeding the 8PSK I/Q modulator, and the last six being reserved for proprietary use.

Some more information about the digital interface, the digRF protocol and the environment thereof may be found at the Internet address "www.digrf.com", for instance in the document "DigRF, Baseband/RF digital interface specification: Logical, Electrical and timing characteristics", Version 1.12.

BRIEF SUMMARY OF THE INVENTION

This industrial standard is not yet sufficient. So, the object of this invention is to improve the situation.

For this purpose, it provides a control device, dedicated to the control of the transmission of coded values onto a digital interface connecting a baseband device and a baseband interface device (or BAI device) (comprising at least a modulator feeding a gain controller), of a wireless communication equipment, and comprising a storing means for storing a coding table establishing a correspondence between symbols for the BAI device and coding values to transmit to the BAI device through the digital interface.

This control device is characterized in that its coding table comprises a first group of symbols comprising data words for feeding the modulator and a second group of symbols comprising command words for controlling the operation of the modulator and/or the gain controller, but also in that it comprises a control means arranged, when it receives a symbol from the baseband device, to determine in the storing means the coded value corresponding to this symbol in order it could be transmitted to the radiofrequency device through the digital interface.

In other words the invention offers to use some of the symbols, stored in the coding table, for feeding the modulator with data and the remaining symbols, also stored in the coding table, for the transmission of commands to the modulator and/or the gain controller, through the digital interface.

The control device according to the invention may include additional characteristics considered separately or combined, and notably:
- at least one of the symbols of the second group may be a command word for assigning a chosen gain value to the gain controller,
- at least one of the symbols of the second group may be a command word for assigning a chosen working mode to a filter means and/or a modulation means of the modulator,
- at least one of the symbols of the second group may be a command word for assigning a chosen working mode to a filter means and/or a modulation means of the modulator and a chosen gain value to the gain controller,
- the working mode may be for instance an "initialization mode" for pre-loading the filter means with a chosen sequence of rotated valid symbols for an immediate up-ramping of the modulator, or a "reset mode" to force binary values of zero into the delay chain of the modulator's filter (to put all delays to zero, resulting in a sharp transition to zero output, i.e. an immediate down-ramping of the modulator), or else a "forced to zero mode" to force at least one binary value of zero into the modulator (which results in a smooth down ramping/up ramping at the input). In this case, the control device may be arranged to deliver a command word for assigning an initialization mode before transmission to the filter means of a last guard bit filling a guard interval, and/or to deliver a command word for assigning a reset mode just after the transmission of an active part of a data burst to the filter means and during the guard interval,
- when the modulator comprises a GMSK IQ modulator and a 8PSK I/Q modulator, each coded value may be a four-bit word comprising three most significant bits (MSB) and a low significant bit (LSB) for differentiating the GMSK I/Q modulator from the 8PSK I/Q modulator. In this case, the first group may comprise at least eight symbols and the second group may comprise at least six symbols.

The invention also provides a baseband device, for a wireless communication equipment comprising a BAI device adapted to be connected to said baseband device through a digital interface, and comprising a control device such as the one above introduced.

The invention also provides a baseband interface device (or BAI device) for a wireless communication equipment comprising a baseband device such as the one above introduced and adapted to be connected to the BAI device through a digital interface. This BAI device comprises at least a modulator, a gain controller fed by the modulator, a storing means adapted to store a control table establishing a correspondence between coding values, transmitted by the digital interface, and symbols representing command words for controlling its operation and data words for feeding the modulator, and a control means connected to the digital interface, the modulator and the gain controller, and arranged, when it receives a coding value from the digital interface, to determine in the storing means the word corresponding to the received coding value in order to transmit it to the modulator and/or the gain controller.

In alternative, the BAI device is dedicated to a wireless communication equipment comprising a baseband device connected to it, through a digital interface, and a control device such as the one above introduced.

It is important to notice that the baseband device, the BAI device and the RF device may be defined on a same chip, or on separate chips, and that any combination of two of these three devices may be also defined on a same chip. But whatever the configuration these devices must use the above mentioned digital interface.

The invention also provides a wireless communication equipment comprising a baseband device, a digital interface, a control device such as the one above introduced, a BAI device such as the one above introduced, connected to the baseband device trough the digital interface, and a RF device connected to the BAI device.

In alternative, the wireless communication equipment may comprise a baseband device such as the one above introduced, a digital interface, a BAI device such as the one above introduced, connected to the baseband device through the digital interface, and a RF device connected to the BAI device.

Such equipments may be mobile phones, for instance.

BRIEF DESCRIPTION OF THE SEVERAL VIEWS OF THE DRAWING(S)

Other features and advantages of the invention will become apparent on examining the detailed specifications hereafter and the appended drawings, wherein.

DETAILED DESCRIPTION OF THE INVENTION

The appended drawings may not only serve to complete the invention, but also to contribute to its definition, if need be.

Figure 1:
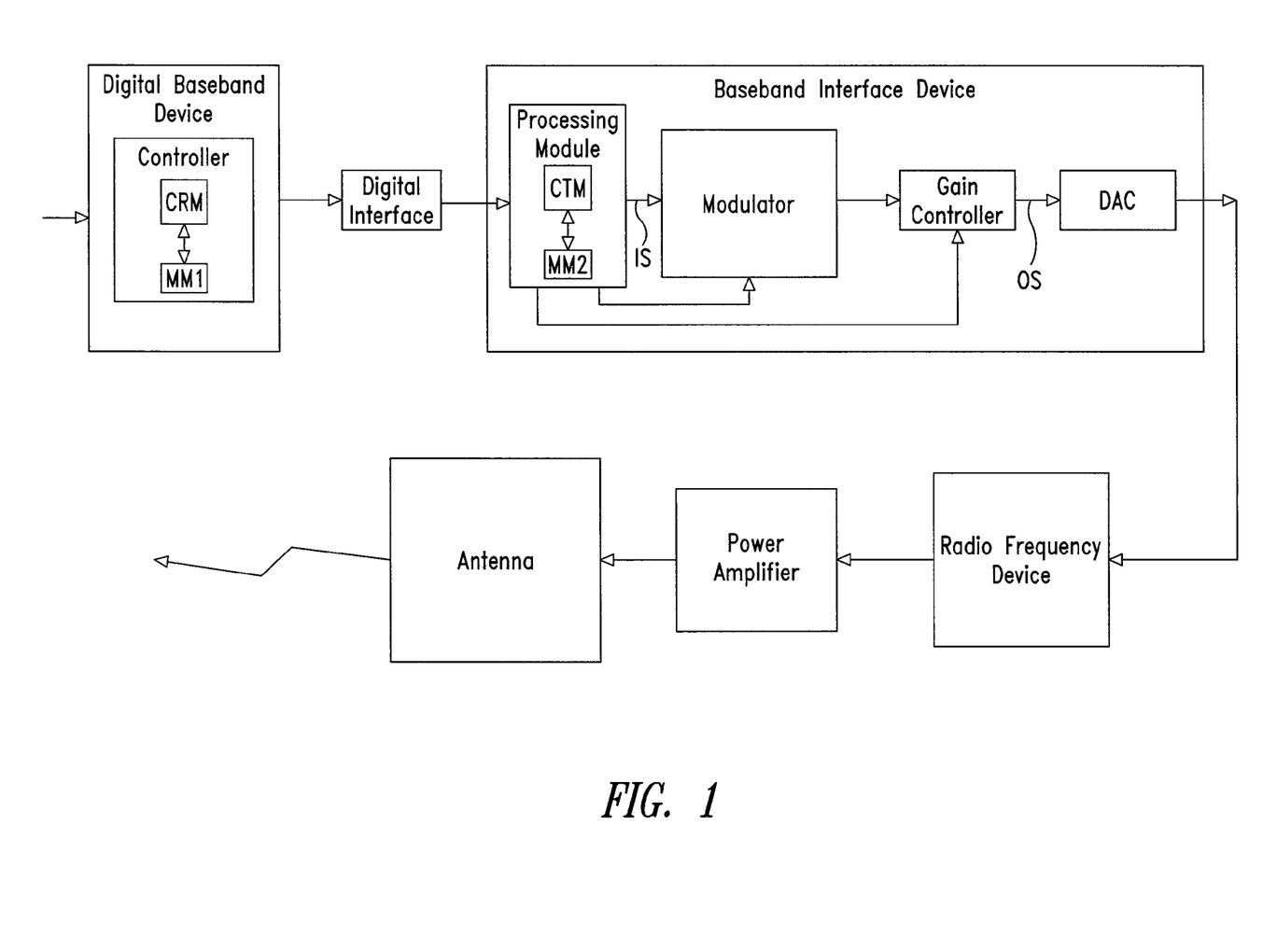
FIG. 1 schematically illustrates an example of transmission path comprising a control device according to the invention, FIG. 2A schematically illustrates a simplified example of embodiment of a 8PSK I/Q modulator and a zeroth-order path of a linearized GMSK I/Q modulator belonging to a joint 8PSK/GMSK I/Q modulator of a communication device according to the invention, FIG. 2B schematically illustrates a simplified example of embodiment of the first-order (or quadratic) path of the linearized GMSK I/Q modulator belonging to a joint 8PSK/GMSK I/Q modulator of a baseband interface device according to the invention, and FIG. 3 schematically illustrates a possible example of timing diagrams for the linearized GMSK I/Q modulator of FIGS. 3A and 3B.

As above mentioned and as it is schematically illustrated in FIG. 1 a digital baseband transmission path of a wireless communication equipment comprises a digital baseband processor (or device) BBD, and a baseband interface device BAI, comprising at least a modulator M, a gain controller GC and a digital to analog converter DAC filter, connected to the digital baseband device BBD through a digital interface I. The digital baseband transmission path is connected to the radiofrequency (RF) device RFD which is itself connected to a power amplifier PA connected to an antenna AN. The digital baseband transmission path, the radiofrequency (RF) device RFD and the power amplifier PA constitute the transmission path.

It is important to notice that the gain stage of the digital baseband transmission path is usually distributed, one part comprising the gain controller GC being located inside the baseband interface device BAI (in a digital or analog form), and another part being located in the RF device RFD (in an analog form).

In the following description it will be considered that the digital interface I is of the type of the interface described in the above cited document "DigRF, Baseband/RF digital interface specification: Logical, Electrical and timing characteristics", Version 1.12. So, it will be considered in the following description, as an illustrating example, that the digital interface I is capable of running at least a part of the digRF protocol stack.

But the invention is not limited to this kind of digital interface.

Moreover, in the following description it will be considered (in a non limiting example of embodiment) that the baseband interface device BAI is a baseband and audio interface device.

Furthermore, in the following description it will be considered that the modulator M is a joint 8PSK/GMSK I/Q modulator installed in a wireless communication equipment, such as a GSM mobile phone with enhanced data rate according to the EGPRS (or EDGE) standard. In other words the modulator M is adapted to switch in multimode operation from a GMSK modulation scheme to an 8PSK modulation scheme and vice versa in consecutive time slots of a GSM frame.

But the invention is not limited to this kind of switching which requires a switching between the linear and non-linear modes of a power amplifier. Indeed this invention generally applies to any switching schemes of modulators, and notably those based on Laurent's construction of digitally phase modulated signals by superposition of amplitude modulation pulses. Some more details about this Laurent's construction may be found in the document of P. A. Laurent "Exact and approximate construction of digital phase modulations by superposition of amplitude modulated pulses (AMO)", IEEE Transactions on communications, Vol. 42, No. 2/3/4, 1994.

Furthermore, the invention is not limited to modulators installed in mobile phone. The modulator according to the invention may be installed in any wireless communication equipment, and notably in laptop or PDA (Personal Digital Assistant) comprising a communication device.

As it is known by one skilled in the art, the baseband device BBD of a mobile phone (for instance) mainly comprises a speech coder, a channel coder, an interleaver and a ciphering. This baseband device BBD is linked to the baseband and audio interface device BAI notably through the digital interface I (other connection means may be provided). The baseband and audio interface device BAI comprises a processing module PM (comprising a burst formatter (or builder), a differential encoder for GMSK signals, and a control module CTM), the joint 8PSK/GMSK I/Q modulator M, the gain controller GC, and the digital to analog converter DAC.

As it is schematically illustrated in FIG. 1 the control module CTM may be external to the modulator M, but it may also constitute a part of the joint 8PSK/GMSK modulator M.

The control module CTM, the joint 8PSK/GMSK I/Q modulator M, the gain controller GC and the digital to analog converter DAC are preferably integrated circuits.

As illustrated in FIG. 1 the baseband device BBD may comprise at least a part of a control device CD for controlling the transmission of coded values to the modulator M through the digital interface I, which is capable of running the digRF protocol stack (in this non limiting example). This control device CD will be described below.

Figure 2A:
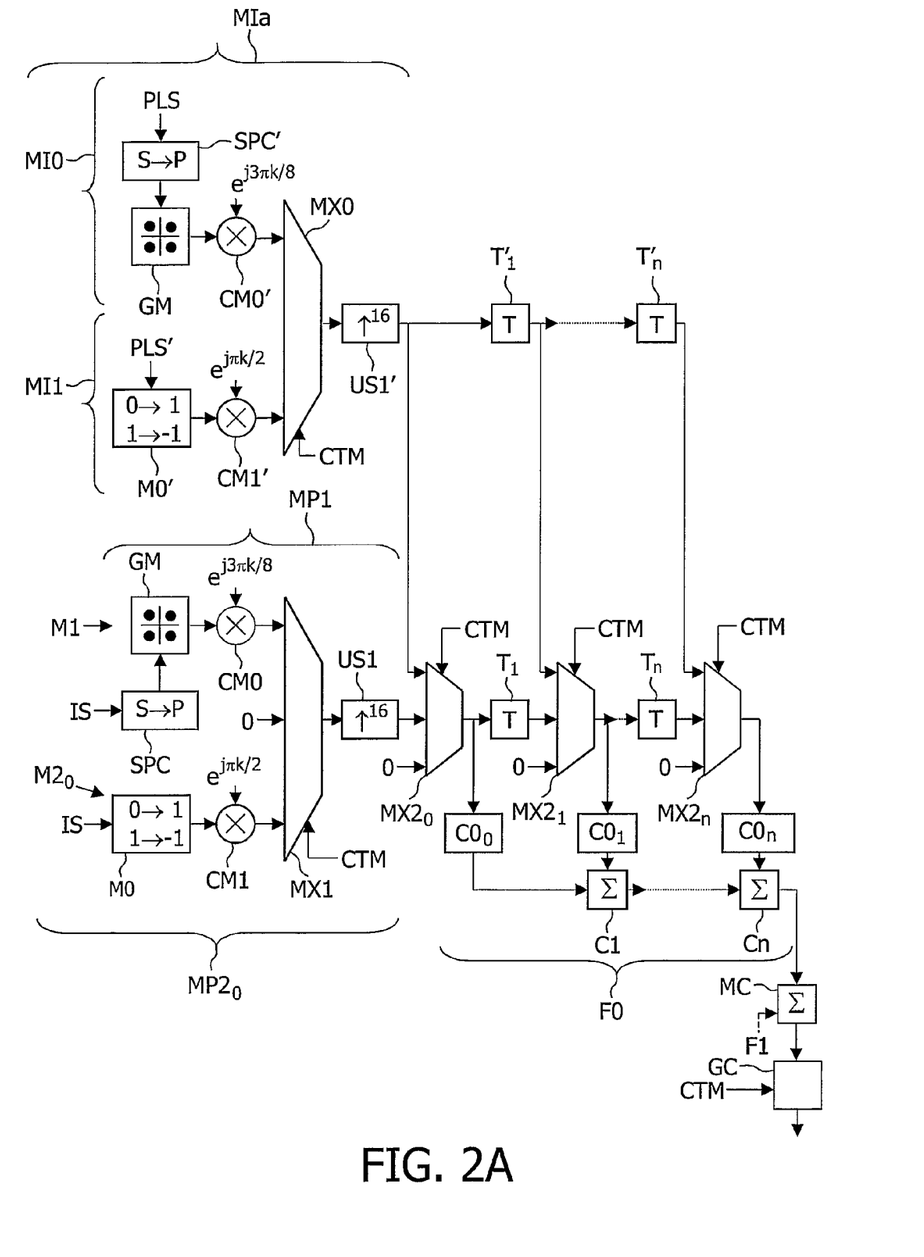
Figure 2B:
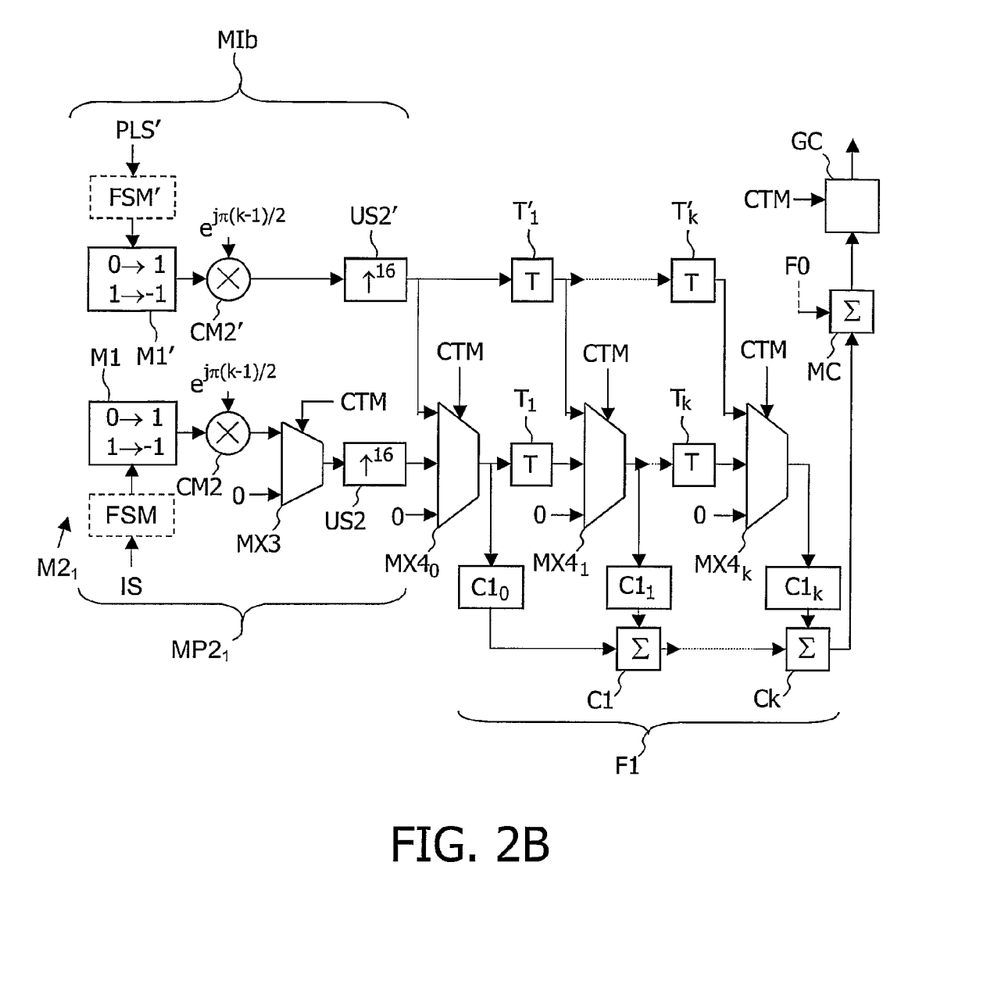

The modulator M is provided with digital input signals IS by the processing module PM and arranged, in the described example, to feed either an 8PSK I/Q modulator M1 or a linearized GMSK I/Q modulator M2 according to the type of the input signals IS to modulate. In FIG. 2, M1 comprises MP1 and F0, M2 comprises $M2_0$ and $M2_1$, $M2_0$ comprises $MP2_0$ and F0 (shared with M1), and $M2_1$ comprises $MP2_1$ and F1.

As illustrated in FIGS. 2A and 2B, the linearized GMSK I/Q modulator M2 preferably comprises a zero-th order modulation path $M2_0$ ($MP2_0$ and F0), also named linear path, and at least a first order modulation path $M2_1$ ($MP2_1$ and F1), also named quadratic path, fed with the same input signals IS. It is important to notice that the linearized GMSK I/Q modulator M2 is more generally a n-th order GMSK I/Q modulator which comprises n+1 modulation paths ($n \geq 0$) fed with the same input signals IS. Therefore the modulator M may comprise a GMSK I/Q modulator comprising more than two modulation paths.

The linear path comprises a modulation part $MP2_0$ feeding a filter part F0, also named C0 filter. The quadratic path comprises a modulation part $MP2_1$ feeding a filter part F1, also named C1 filter.

The 8PSK I/Q modulator M1 comprises a modulation part MP1 feeding the C0 filter F0 that it shares with the linear path of the linearized GMSK I/Q modulator M2.

The respective outputs of the C0 filter F0 and C1 filter F1 are connected to the inputs of a main combiner MC to feed it with modulated and filtered I/Q signals. The output of the main combiner MC is connected to the gain controller GC itself connected to the digital to analog converter DAC to feed it with the modulated and filtered I/Q signals OS.

The 8PSK I/Q modulator M1 and the linearized GMSK I/Q modulator M2 each comprise a modulation section for generating modulated digital I/Q signals associated to time slots of GSM frames and a filter section for applying a chosen pulse shape defined by filter values to the digital I/Q signals in order to output modulated and filtered digital I/Q signals.

As is schematically illustrated in FIG. 2A the modulation part MP1 of the multislot 8PSK F/Q modulator M1 may comprise a serial to parallel converter SPC fed with serial data stream (or digital input signals) IS by the multiplexer MU of the modulator M. It is recalled that the speech signals (but it may be also pure data) may be quantized by the speech coder and then organized into data frames by the channel coder.

For instance the serial to parallel converter SPC is at least a three-bit serial to parallel converter that outputs three-bit parallel signals. Preferably it is a four-bit serial to parallel converter that outputs four-bit parallel signals where the LSB (Least Significant Bit) is used to distinguish between GMSK data and 8PSK data as well as between various active (or gain)/reset/preload modes.

The modulation part MP1 of the multislot 8PSK I/Q modulator M1 also comprises a Grey mapper GM fed with the three-bit parallel signals and arranged to map each bit triplet on one out of eight complex signals.

The modulation part MP1 of the multislot 8PSK I/Q modulator M1 also comprises a complex multiplier CM0 arranged to shape the I/Q signals outputted by the Grey mapper GM. More precisely the complex multiplier CM0 is responsible for the mapping of the k-th symbols it receives onto the unit circle. The complex multiplier CM0 multiplies each received signal by a rotation signal equal to $\exp(jk3\pi/8)$ to introduce a rotation of $3k\pi/8$ radians.

The symbol mapping combines the signals outputted by the Grey mapper GM as well as the additional rotation symbol of the $\exp(j3\pi k/8)$ term. The Grey mapper GM can be seen as a group of gates which translates the 3-bit symbols into the corresponding position on a unit circle according to a chosen rule. So the multiplier CM0 outputted rotated symbols which allow to avoid zero crossings in the RF envelope.

The modulation part MP1 of the multislot 8PSK I/Q modulator M1 also comprises a "shared" 3×1 multiplexer MX1 comprising a first input fed by the output of the complex multiplier CM0, a second input for zero setting, a third input fed by a complex multiplier CM1 of the modulation part $MP2_0$, and one output feeding with input samples an up-sampler US1 adapted to carry out an up-sampling aiming at inserting N−1 zeros after each input sample. For instance and as illustrated N=16.

The function of the multiplexer MX1 is to select between zeros during each guard period and the rotated 8PSK or GPSK symbols during the time slots (or active part of the bursts). Feeding the up-sampler US1 (and the following C0 filter F0) with zeros during the guard period enables a smooth step-on and step-off response of the C0 filter F0.

This up-sampler US1 feeds the shared filter part (or C0 filter) F0 with zeros or modulated digital 8PSK or GMSK I/Q signals through a multiplexer $MX2_0$.

The serial to parallel converter SPC, the Grey mapper GM, the multiplier CM0, the shared multiplexer MX1 and the shared up-sampler US1 constitute the modulation part MP1 of the multislot 8PSK I/Q modulator M1.

The C0 filter F0 is a pulse-shaping filter which has for instance 80 taps $C0_i$ (i=0 to n, where n=79) and may be split into m sections $F0_s$ (s=1 to m), where m=1 to 80, each having 80/m filter coefficients $C0_i$ (for instance when m=5 there are 5 sections each having 16 taps). This C0 filter F0 is used for 8PSK and shared with the zeroth-order part of the GMSK modulator. It is recalled that in GSM, the time-bandwidth product is BT=0.3 and the Gaussian pulse is treated as limited to −2T . . . 2T.

The C0 pulse-shaping filter F0 is preferably a low pass filter defining a finite impulse response (FIR) filter. Such a low pass filter is described in the document of P. Jung, "Laurent's representation of binary digital continuous phase modulated signals with modulation index ½ revisited," IEEE Trans. Comm., vol. 42, pp 221-224, 1994.

Each part $F0_i$ of the C0 pulse-shaping filter F0 applies a chosen pulse shape defined by filter values (or coefficients) $C0_i(t)$ to the modulated digital I/Q signals it receives in order to output modulated and filtered digital I/Q signals. The signal serially travels through all $F0_i$.

Each filter coefficient $C0_i$ of the C0 pulse-shaping filter F0 is fed with the same signals (possibly time delayed) through a multiplexer $MX2_i$;. More precisely, the filter coefficient $C0_0$ is fed by the output of the multiplexer $MX2_0$, which also feeds one of the three inputs of the following multiplexer $MX2_1$ through a module $T_1$. The filter coefficient $C0_1$ is fed by the output of the multiplexer $MX2_1$, which also feeds one of the three inputs of the following multiplexer $MX2_2$ through a module $T_2$, and so on. And finally, the filter coefficient $C0_n$ is fed by the output of the multiplexer $MX2_n$ through a module $T_n$. Each module $T_i$ (i=1 to n) is arranged to introduce a chosen delay in time domain.

In the illustrated example, the C0 filter F0 also comprises n−1 combiners (or adders) C1 to Cn for combining together the signals respectively outputted by each of its n filter coefficients $C0_i$. So the output of the last combiner (or adder) Cn of the C0 filter F0 is connected to one of the two inputs of the main combiner MC, whose output is connected to the gain controller GC, itself connected to the digital to analog converter DAC.

The zero-th order modulation path ($MP2_0$ and F0) of the multislot linearized GMSK I/Q modulator M2 comprises a mapper M0 arranged to map each received signals on one out of two complex signals.

The zero-th order modulation path also comprises a complex multiplier CM1 arranged to shape the I/Q signals outputted by the mapper M0. The complex multiplier CM1 is responsible for the mapping of the symbols it receives onto the unit circle (the mapper M0 outputs the possible alphabet −1,1 and the complex multiplier CM1 maps the alphabet on the unit circle choosing one out of four possible positions). The complex multiplier CM1 multiplies each received signal by a rotation signal equal to $\exp(jk\pi/2)$ to introduce a rotation of $k\pi/2$ radians.

The multiplier CM1 is connected to the third input of the above mentioned shared 3×1 multiplexer MX1.

The mapper M0, the multiplier CM1, the shared multiplexer MX1 and the shared up-sampler US1 constitute the modulation part $MP2_0$ of the multislot GMSK I/Q modulator M2.

The first order (or quadratic) modulation path ($MP2_1$ and F1) of the multislot linearized GMSK I/Q modulator M2 comprises a Finite State Machine FSM fed with the same digital GMSK signals than the mapper M0 of the zero-th order modulation path ($MP2_0$ and F0).

The first order modulation path also comprises a mapper M1 arranged to map each signal coming from the Finite State Machine FSM on one out of two complex signals.

The first order modulation path also comprises a complex multiplier CM2 arranged to shape the I/Q signals outputted by the mapper M1. The complex multiplier CM2 multiplies each received signal by a rotation signal equal to $\exp(j(k-1)\pi/2)$ to introduce a rotation of $(k-1)\pi/2$ radians.

The first order modulation path also comprises a 2×1 multiplexer MX3 comprising one input fed by the output of the complex multiplier CM2, one input for zero setting and one output feeding with input samples an up-sampler US2 adapted to carry out an up-sampling aiming at inserting N−1 zeros after each input sample. For instance and as illustrated N=16.

The function of the multiplexer MX3 is to select between zeros during each guard period and the rotated GMSK symbols (or bits) during the time slots (or active part of the bursts).

The Finite State Machine FSM, the mapper M1, the complex multiplier CM, the multiplexer MX3, and the up-sampler US2 defined together the modulation part $MP2_1$ of the first order modulation path of the multislot linearized GMSK I/Q modulator M2.

The up-sampler US2 feeds the filter part (or C1 filter) F1 with zeros or modulated digital GMSK I/Q signals through a multiplexer $MX4_0$.

The C1 filter F1 is a pulse-shaping filter which has for instance 48 taps $C1_j$ (j=0 to k, where k=47) and is split into p sections ($F1_p$, where p=1 to 3 in this example), each having 16 filter coefficients $C1_j$. The filter lengths of both filters F0 and F1 have to be the same, namely 80 taps (so, k=n). However, the upper 32 taps of the C1 filter F1 are 0, so they do not have to be realized. It is important to notice that in order to insure a proper time alignment, the summation between the output of the C0 filter F0 and C1 filter F1 has to be done properly.

The C1 pulse-shaping filter F1 is preferably a low pass filter defining a finite impulse response (FIR) filter. Such a low pass filter is also described in the above mentioned document of P. Jung.

Each part $F1_j$ of the C1 pulse-shaping filter F1 applies a chosen pulse shape defined by filter values (or coefficients)

$C1_j(t)$ to the modulated digital I/Q signals it receives in order to output modulated and filtered digital I/Q signals.

Each coefficient filter $C1_j$ of the C1 pulse-shaping filter F1 is fed with the same signals (or a delayed version of it) through a multiplexer $MX4_j$. More precisely, the filter coefficient $C1_0$ is fed by the output of the multiplexer $MX4_0$, which also feeds one of the three inputs of the following multiplexer $MX4_1$ through a module $T_1$. The filter coefficient $C1_1$ is fed by the output of the multiplexer $MX4_1$, which also feeds one of the three inputs of the following multiplexer $MX4_2$ through a module $T_2$, and so on. And finally, the filter coefficient $C1_k$ is fed by the output of the multiplexer $MX4_k$ through a module $T_k$.

In the illustrated example, the C1 filter F1 also comprises k−1 combiners (or adders) C1 to Ck for combining together the signals respectively outputted by each of its k filter coefficients $C1_j$. So the output of the last combiner (or adder) Ck of the C1 filter F1 is connected to one of the two inputs of the main combiner MC, whose output is connected to the gain controller GC, itself connected to the digital to analog converter DAC.

In the illustrated example the joint modulator M also comprises initialization (or pre-load) means for loading the FIR filter states with a "dummy" sequence of rotated valid symbols during the guard period between two time slots, i.e. before the transmission of the active part of the burst ("initialization mode"), and/or just after the active part of a burst ("reset mode"). These rotated valid symbols are time-aligned with the consecutive guard bits and data bits which respectively fill the guard interval and the consecutive time slots that enclose it.

More precisely, the initialization operation aims at loading all the flip-flops in the C0 FIR filter F0 and C1 FIR filter F1 (modules T (for delay in time domain)) with valid symbols. A valid symbol is any possible bit combination out of the GMSK alphabet and properly rotated (and delayed).

The rotation of the dummy sequence allows to switch between a dummy sequence and data bits without phase jumps. Effectively, the filter (F0, F1) having 80 taps, an input signal will have to travel first through the filter before being visible at the output. So, a valid dummy sequence of rotated valid symbols must be loaded into the FIR filters during the guard period when it is possible to transmit anything as long as it is compliant with the power-time template.

With this kind of initialization one can obtain a sharp transition from a very small amplitude (due to the absence of transmission during the guard period) to the required amplitude level.

The initialization (or pre-load) means may be divided in two parts: a first one MIa dedicated at least to the zeroth-order path ($MP2_0$ and F0) of the linearized GMSK I/Q modulator M2, and also possibly to the multislot 8PSK I/Q modulator M1 (as illustrated in FIG. 2A), and a second one MIb dedicated to the multislot first-order path ($MP2_1$ and F1) of the linearized GMSK I/Q modulator M2 (as illustrated in FIG. 2B).

In the example illustrated in FIG. 2A, the first part MIa of the initialization (or pre-load) means comprises a sub part MI0 dedicated to the multislot 8PSK I/Q modulator M1 (and which is not mandatory when GMSK switching is only used) and a second part MI1 dedicated to the zeroth-order path ($MP2_0$ and F0) of the linearized GMSK I/Q modulator M2.

The first sub part MI0 comprises a serial to parallel converter SPC' fed with chosen sequence of initialization (or pre-load) bits PLS. As the serial to parallel converter SPC, this serial to parallel converter SPC' is for instance a three-bit serial to parallel converter that outputs three-bit parallel signals PLS.

The first sub part MI0 also comprises a Grey mapper GM' fed with the three-bit parallel signals and arranged to map each bit triplet on one out of eight complex signals.

The first sub part MI0 also comprises a complex multiplier CM0' arranged to shape the signals outputted by the Grey mapper GM'. The complex multiplier CM0' multiplies each received signal by a rotation signal equal to $\exp(jk3\pi/8)$ to introduce a rotation of $3k\pi/8$ radians. So the multiplier CM0' outputs rotated symbols which allow to properly phase-align them with the input data when switching between preload, reset and active modes.

In an alternative it is possible to generate input sequences in which all the bits are equal to zero (0) or one (1). For this purpose it is possible to hardwire the complex multiplier CM0' input to minus one (−1) or one (1), thus omitting the serial to parallel converter SPC' and also the Grey mapper (or even the whole branch if the 8PSK initialization switching is not foreseen).

The second sub part MI1 comprises a mapper M0' fed with a chosen sequence of initialization (or pre-load) bits PLS', and arranged to map each bit on one out of two complex signals as the mapper M0.

The second sub part MI1 also comprises a complex multiplier CM1' arranged to shape the signals outputted by the mapper M0'. The complex multiplier CM1' multiplies each received signal by a rotation signal equal to $\exp(jk\pi/2)$ to introduce a rotation of $k\pi/2$ radians. So the multiplier CM1' outputs rotated symbols which allow to properly phase-align them with the input data when switching between preload, reset and active modes.

In an alternative it is possible to generate input sequences in which all the bits are equal to zero (0) or one (1). For this purpose it is possible to hardwire the complex multiplier CM1' input to minus one (−1) or one (1), thus omitting the mapper M0'.

The first part MIa of the initialization means also comprises a shared 2×1 multiplexer MX0 comprising a first input fed by the output of the complex multiplier CM0', a second input fed by the complex multiplier CM1', and one output feeding with input samples an up-sampler US1' adapted to carry out an up-sampling aiming at inserting N−1 zeros after each input sample in order to output the chosen valid rotated bits for the initialization (or pre-loading) mode. In the illustrated example N=16.

The function of the multiplexer MX0 is to select between the rotated 8PSK and GPSK symbols during the pre-load or reset mode (when it is implemented, i.e. when the initialization of the 8PSK path is foreseen).

The output of the up-sampler US1' is connected to the first input of the multiplexer $MX2_0$ and to each first input of each other multiplexer $MX2_1$ to $MX2_k$ respectively through modules $T'_1$ to $T'_k$ (delay in time domain modules).

So the first input of each multiplexer $MX2_i$ is fed with rotated signals for initialization (or pre-load) mode purpose, the second input of each multiplexer $MX2_i$ is fed with rotated signals for active mode purpose, and the third input of each multiplexer $MX2_i$ is fed with zeros sequence for a reset mode purpose.

The second part MIb of the initialization (or pre-load) means comprises a Finite State Machine FSM preferably fed with the same chosen sequence of initialization (or pre-load) bits PLS' than the mapper M0'.

The second part MIb also comprises a mapper M1' arranged to map each signal coming from the Finite State Machine FSM' on one out of two complex signals.

The second part MIb also comprises a complex multiplier CM2' arranged to shape the signals outputted by the mapper M1'. The complex multiplier CM2' multiplies each received signal by a rotation signal equal to expo(k−1)π/2 to introduce a rotation of (k−1)π/2 radians. So the multiplier CM2' outputs rotated symbols which allow to properly phase align them when switching between active, preload and reset modes.

The second part MIb also comprises an up-sampler US2' fed by the output of the multiplier CM2' with the rotated symbol samples and adapted to carry out an up-sampling aiming at inserting N−1 zeros after each sample in order to output the chosen valid rotated bits for the initialization (or pre-loading) mode. In the illustrated example N=16.

The output of the up-sampler US2' is connected to the first input of the multiplexer $MX4_0$ and to each first input of each other multiplexer $MX4_1$ to $MX4_k$ respectively through modules $T'_1$ to $T'_k$ (delay in time domain modules).

So the first input of each multiplexer $MX4_j$ is fed with rotated signals for initialization (or pre-load) mode purpose, the second input of each multiplexer $MX4_j$ is fed with rotated signals for active mode purpose, and the third input of each multiplexer $MX4_j$ is fed with zero sequence for a reset mode purpose.

In an alternative it is possible to generate input sequences in which all the bits are equal to zero (0) or one (1). For this purpose it is possible to hardwire the complex multiplier CM2' input to minus one (−1) or one (1), thus omitting the mapper M2' and the Finite State Machine FSM'.

One can notice that the complex multipliers CM1 and CM2 may comprise an additional input fed with a chosen constant value and respectively with the exp(jkπ/2) and expo (k−1)π/2) terms, which results in the omission of the mappers M0 and M1. This is possible because the initialization (or pre-loading) needs to be done only with valid and properly rotated symbols. For this purpose it is possible to hardwire the additional input to 1 (or −1) and still rotating by the CMi's results in a properly rotated dummy sequence which can be phase align with the active mode, i.e. switched without introducing phase jumps. In this case, it is also possible to omit the Finite State Machine FSM (which acts approximately as a modulo 2 adder) because it calculates the same output for every constant input.

The joint modulator M may also comprise reset means for loading the FIR filter states with an all zero sequence (coefficients $C0(i)$ and $C1(j)$) just after the transmission of the active part of the burst and during the guard period. This chosen all zero sequence is provided to obtain a fast transition of the FIR filter states from the last valid symbol (with the transmitted amplitude) to the all zero state of the guard period which corresponds to a very small amplitude. The zero sequence travelling through the FIR filters appears as a smooth step-on/step-off at the filter's output.

Such an all zero sequence may be introduced through the third input of each multiplexer $MX2_i$ or $MX4_j$, or else through the first input of each multiplexer $MX2_i$ or $MX4_j$ (dedicated to the pre-load (or initialization) signals) when it is generated by the initialization means (in this case the initialization means also acts as a reset means).

As mentioned above, in order the transitions between on/off states (data mode versus initialization modes) be instantaneous, the modulation switching as well as the gain changes must be timed accurately.

For this purpose the control device CD according to the invention comprises a dedicated memory MM1 in which is stored a coding table establishing a correspondence between symbols for the baseband and audio interface device BAI and coding values to transmit to the radiofrequency device RFD through the digital interface I.

More precisely, this coding table comprises a first group of symbols (for instance at least 8 and preferably 10 (8 for 8PSK and 2 for GMSK)) comprising data words for feeding the modulator M (M1, $M2_0$ and $M2_1$) and a second group of symbols (for instance at least 6) comprising command words for controlling the operation of the modulator M and/or the gain controller GC.

Such a coding table allows to convert a symbol, generated in the baseband device BBD, into a specific coded value (or transmit symbol bits) adapted to be transmitted to the baseband and audio interface device BAI through the digital interface I.

When the baseband device BBD needs to transmit data or command(s) to the baseband and audio interface device BAI, it transmits it (or them) to the control device CD. Then the control device CD transmits the data or command(s) to a control module CRM it comprises and which is arranged to access to the dedicated memory MM1 to determine in its coding table the coded value corresponding to the data or command(s) to transmit. Then the control module CRM transmits this coded value to the baseband device BBD in order it could be transmitted to the baseband and audio interface device BAI.

In the illustrated example the whole control device CD (control module CRM and dedicated memory MM1) is located inside the baseband device BBD, but this is not mandatory. Indeed, a part of the control device CD, and notably the dedicated memory MM1, may be located outside the baseband device BBD.

The coding table may be implemented as a software or firmware, but it could be also a protocol stack running on the digital interface I.

The processing module PM of the baseband and audio interface device BAI comprises a dedicated memory MM2 storing a control table establishing a correspondence between the coding values of the coding table and symbols representing command words for controlling the operation of the modulator M and/or the gain controller GC and data words for feeding the modulator M, and a control module CTM connected to the memory MM2, the digital interface I, to receive the transmit symbol bits coded with the coding table, and to the modulator M (and more precisely to the multiplexers MX1, $MX2_i$, MX3 and $MX4_j$ and also to MX0 when it is foreseen) and the gain controller GC.

When the control module CTM receives a coded value from the digital interface I, i.e. transmit symbol bits coded with the coding table, it accesses to the dedicated memory MM2 to determine in its control table the word which corresponds to the received coded value. Then it transmits this word to the modulator M and/or to the gain controller GC.

In the illustrated example the control module CTM and the dedicated memory MM2 are located inside the baseband and audio interface device BAI, but this is not mandatory. Indeed, at least the dedicated memory MM2 may be located outside the baseband and audio interface device BAI.

The control table may be implemented as a software or firmware, but it could be also a protocol stack running on the digital interface I. The whole modulator including the protocol stack could be also implemented in firmware.

The symbols of the second group may be used to define every type of command adapted to control the operation of the modulator M and/or the gain controller GC.

For instance a command word may be provided for assigning a chosen gain value to the gain controller GC, or for assigning a chosen working mode to the C0 filter F0 (multiplexers MX2$_i$) and/or the C1 filter F1 (multiplexers MX4$_j$) and/or the modulation part(s) MIa (multiplexers MX0 and MX1) and/or MIb (multiplexer MX3).

A command word may also be provided for assigning a chosen working mode to the C0 filter F0 (multiplexers MX2$_i$) and/or the C1 filter F1 (multiplexers MX4$_j$) and/or the modulation part(s) MIa (multiplexers MX0 and MX1) and/or MIb (multiplexer MX3) and a chosen gain value to the gain controller GC.

Here one means by "working mode" the above described initialization mode used to pre-load the filter(s) F0 and/or F1 with a chosen sequence of rotated valid symbols for an immediate up-ramping of the modulator M, or the above described reset mode used to force binary values of zero into all the delays of the modulator M for an immediate down-ramping of it, or else the transmission of valid data symbols out of the modulator's alphabet.

But other working modes may be envisaged.

When the modulator M or the gain controller GC receives a word from the control module CTM, it transmits it to the concerned element (multiplexer and/or serial to parallel converter and/or mapper and/or Finite State Machine and/or gain multiplier) in order it could carry out the corresponding action at the proper instant.

In case where the modulator M comprises a GMSK I/Q modulator M2$_0$ and M2$_1$ and a 8PSK I/Q modulator M1, the coding table and the control table are preferably of the type defined in the above cited document "DigRF, Baseband/RF digital interface specification: Logical, Electrical and timing characteristics", Version 1.12.

More precisely, each coded value according to the digRF standard is a four-bit word comprising three most significant bits (MSB) and a low significant bit (LSB). The LSB is used to differentiate the GMSK I/Q modulator M2$_0$ and M2$_1$ from the 8PSK I/Q modulator M1. The MSB are sent first.

Moreover and still according to the digRF standard, the first group of symbols comprises ten symbols each dedicated to different data and the second group of symbols comprises six symbols dedicated to different commands.

An example of coding table is given hereafter (the control table can be easily deduced from this coding table by inverting the input and the output):

| Output (coded value) Hexadecimal value | Output (coded value) Binary value | Input (symbol) Description |
|---|---|---|
| 0x0 | 0b0000 | GMSK symbol "0" |
| 0x2 | 0b0010 | GMSK symbol "1" |
| 0x4 | 0b0100 | Reset GMSK modulator (forced to zero) without gain change, symbol "R" |
| 0x6 | 0b0110 | Reset GMSK modulator (forced to zero) With gain change, symbol "RG" |
| 0x8 | 0b1000 | Pre-load GMSK modulator without gain change, symbol "P" |
| 0xA | 0b1010 | Pre-load GMSK modulator With gain change, symbol "PG" |
| 0xC | 0b1100 | Zero without gain change, symbol "Z" |
| 0xE | 0b1110 | Zero with gain change, symbol "ZG" |
| 0x1 | 0b0001 | 8PSK symbol "000" |
| 0x3 | 0b0011 | 8PSK symbol "001" |
| 0x5 | 0b0101 | 8PSK symbol "010" |
| 0x7 | 0b0111 | 8PSK symbol "011" |
| 0x9 | 0b1001 | 8PSK symbol "100" |

-continued

| Output (coded value) Hexadecimal value | Output (coded value) Binary value | Input (symbol) Description |
|---|---|---|
| 0xB | 0b1011 | 8PSK symbol "101" |
| 0xD | 0b1101 | 8PSK symbol "110" |
| 0xF | 0b1111 | 8PSK symbol "111" |

It is important to notice that the stored coding table or control table does not need to comprise both hexadecimal values and binary values.

In this table the two first symbols are dedicated to the two different data words for the GMSK I/Q modulator M2$_0$ and M2$_1$, the six following symbols are initially dedicated to proprietary use and finally assigned to six modulator M (multiplexer configuration(s)) and/or gain controller GC (gain change) commands, and the last eight symbols are dedicated to the eight different data words for the 8PSK I/Q modulator M1.

Other formats of coded values may be envisaged.

According to the invention, it is now possible to use the proprietary bits i) to change gain(s) by means of digital multiplier(s) or analog scaling circuit(s), ii) to pre-load the FIR filters (F0 and F1) for step-on of the regular I/Q pulse shaping filter, iii) to reset the FIR filter for step-off of the regular I/Q pulse shaping filter, iv) and to combine gain change(s) with pre-load, reset or forced to zero input.

The use of the command words (proprietary bits) is "meaningless" without an appropriate timing diagram defining the precise time at which each command word must be transmitted to the modulator M and/or the gain controller GC in order it could carries out the corresponding action at the proper instant.

Figure 3:
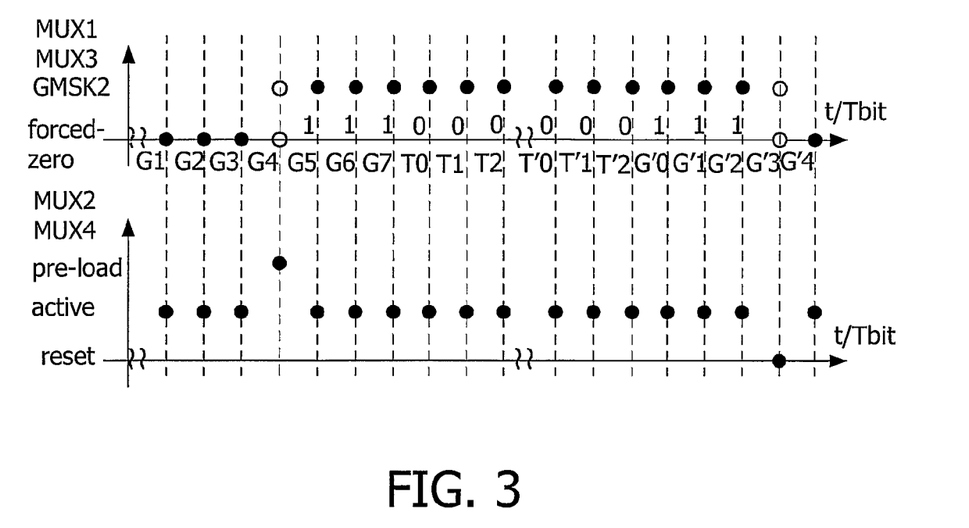

A non limiting example of timing diagram, for the linearized GMSK I/Q modulator M2 and more precisely for its multiplexers MX1 and MX3 (in the upper part) and for its multiplexers MX2 and MX4 (in the lower part), is illustrated in FIG. 3.

Here the pre-loading (or initialization) takes place after the four leading guard bits referenced G1 to G4 which are followed by some specially defined other guard bits G5 to G7. These guard bits filled the guard interval which is inserted between two consecutive time slots filled with data bits.

More precisely, in this example, the guard period takes G1, . . . , G7 (guard bits) but the modulator M2 is switched on only after G4. So, during G1, G2 and G3 the multiplexers MX1 and MX3 are set to forced zero (second input on) while the multiplexers MX2 and MX4 are set to active (second input on). So, a smooth step-down from the previous GMSK burst is obtained. At G4, the multiplexers MX1 and MX3 are switched to GMSK (first input on) while the multiplexers MX2 and MX4 are set to pre-load (first input on) to enable the dummy sequence to be preloaded into the C0 or C1 filter. Thus, a fast amplitude transition occurs at the output and new data bits follow the dummy sequence and "real data" reach the output after 2.5 symbols.

In FIG. 3 tail bits T0 to T2 are followed by data bits (not shown and corresponding to a "normal" transmission), which are followed by other tail bits T'0 to T'2, and t/T bits designates "normalized time scale".

In this example, the resetting part (forced zero) follows after the third trailing guard bit G'3, i.e. after the active part of the burst and after an additional transmission of three more specially defined guard bits (G'0 to G'2). The reset mode could be activated already during G'0 but in practice it is preferable to introduce some time for the switch-off process.

The grey symbols in the upper part of FIG. 3 indicate that either one can be chosen.

In this example only actions on the modulator's multiplexers have been foreseen, but the resetting as well as the pre-loading may be combined with a gain change in the gain controller GC.

The invention is not limited to the embodiments of control device, baseband device, baseband (and audio) interface device and wireless communication equipment described above, only as examples, but it encompasses all alternative embodiments which may be considered by one skilled in the art within the scope of the claims hereafter.

Thus, in the preceding description it has been described a modulator implemented as an integrated circuit, but the invention also applies to a modulator implemented as a pure look-up table where all values are pre-calculated and stored or else as pure firmware.

The invention claimed is:

1. A device, comprising:
a memory configured to store a coding table of coding values corresponding to data words and command words, wherein at least one coding value stored in the coding table corresponds to a command word for assigning a chosen working mode to at least one of a filter and a modulation device of a modulator; and
a controller configured to:
determine from the coding table data words and command words to which coding values received from a baseband device correspond;
when a received coding value is determined to correspond to a data word, provide the data word to the modulator;
when a received coding value is determined to correspond to a command word for controller the modulator, provide the command word to the modulator; and
when a received coding value is determined to correspond to a command word for controlling a gain controller coupled to the modulator, provide the command word to the gain controller.

2. The device according to claim 1 wherein at least one coding value stored in the coding table corresponds to a command word for assigning a chosen gain value to said gain controller.

3. The device according to claim 1 wherein at least one coding value stored in the coding table corresponds to a command word for assigning a chosen working mode to at least one of a filter, a modulation device of said modulator and a chosen gain value to said gain controller.

4. The device according to claim 1 wherein the chosen working mode is one of:
an initialization mode to pre-load said filter with a chosen sequence of rotated valid symbols for an immediate up-ramping of said modulator;
a reset mode to force binary values of zero into said filter of said modulator for an immediate down-ramping of said modulator; and
a force to zero mode to force at least one binary value of zero into said modulator.

5. The device according to claim 4 wherein the controller is configured to provide a command word for assigning an initialization mode before transmission to said filter of a last guard bit filling a guard interval.

6. The device according to claim 4 wherein the controller is configured to provide a command word for assigning a reset mode just after the transmission of an active part of a data burst to said filter and during a guard interval.

7. The device according to claim 1 wherein said modulator comprises a Gaussian Minimum Shift Keying (GMSK I/Q) modulator and an 8 Phase Shift Keying (8PSK I/Q) modulator and each coding value is a four-bit word comprising three most significant bits and a least significant bit to differentiate said GMSK I/Q modulator and said 8PSK I/Q modulator.

8. The device according to claim 7 wherein the coding values in the coding table include at least eight data words and at least six command words.

9. A system, comprising:
a baseband processor configured to generate coding values;
a modulator;
a gain module coupled to an output of the modulator;
a memory configured to store a coding table of:
coding values; and
corresponding data words and command words, wherein at least one coding value stored in the coding table corresponds to a command word for assigning a chosen working mode to at least one of a filter and a modulation device of the modulator; and
a controller coupled to the memory and configured to:
determine from the coding table data words and command words that correspond to coding values received from the baseband processor;
when a coding value is a data word, provide the data word to the modulator;
when a coding value is a command word for controlling the modulator, provide the command word to the modulator; and
when a coding value is a command word for controlling the gain module, provide the command word to the gain module.

10. The system according to claim 9, further comprising a digital interface coupling the baseband processor to the modulator and the gain module, wherein the digital interface includes the memory configured to store the coding table and the controller coupled to the memory.

11. The system according to claim 10, further comprising an audio interface device.

12. The system of claim 9 wherein at least one coding value in the table is a command word to control a working mode of the modulator.

13. The system of claim 12 wherein the working mode of the modulator is one of:
an initialization mode to pre-load a filter with a chosen sequence of rotated valid symbols for an immediate up-ramping of the modulator;
a reset mode to force binary values of zero into the filter for an immediate down-ramping of the modulator; and
a force to zero mode to force at least one binary value of zero into the modulator.

14. A method, comprising:
identifying, using at least one processor, a word in a set of words corresponding to coding values, wherein the set of words includes at least one data word, at least one modulator command word and at least one gain command word, wherein the at least one modulator command word includes a modulator command word for assigning a chosen working mode to at least one of a filter and a modulation device of a modulator;
when a coding value corresponds to a data word, modulating the data word;

when a coding value corresponds to a modulator command word, controlling the modulator based on the modulator command word; and when a coding value corresponds to a gain command word, controlling a gain of a modulated signal based on the gain command word.

15. The method of claim 14 wherein the at least one modulator command word includes at least one mode command word and when the coding value corresponds to the at least one mode command word, the controlling the modulator comprises causing the modulator to enter a mode of operation.

16. The method of claim 15 wherein the mode of operation is an initialization mode to pre-load a filter with a chosen sequence of rotated valid symbols for an immediate up-ramping of the modulator.

17. The method of claim 15 wherein the mode of operation is a reset mode to force binary values of zero into a filter for an immediate down-ramping of the modulator.

18. The method of claim 15 wherein the mode of operation is a force to zero mode to force at least one binary value of zero into the modulator.

19. A device, comprising:
a modulator;
a gain module; and
a controller configured to:
identify a word in a set of words corresponding to a received coding value in a set of coding values, wherein the set of words includes at least one data word, at least one modulator command word and at least one gain command word, wherein the at least one modulator command word includes a command word for assigning a chosen working mode to at least one of a filter and a modulation device of the modulator;
when the received coding value corresponds to a data word, forward the data word to the modulator;
when the received coding value corresponds to a modulator command word, control the modulator based on the modulator command word; and
when the received coding value corresponds to a gain command word, control a gain of the gain module based on the gain command word.

20. The device of claim 19 wherein the at least one modulator command word in the set of words includes:
an initialization mode command word, wherein when the received coding value corresponds to the initialization mode command word the controller is configured to pre-load a filter with a chosen sequence of rotated valid symbols for an immediate up-ramping of the modulator;
a reset mode command word, wherein when the received coding value corresponds to the reset mode command word the controller is configured to force binary values of zero into the filter for an immediate down-ramping of the modulator; and
a force to zero mode command word, wherein when the received coding value corresponds to the force to zero mode command word, the controller is configured to force at least one binary value of zero into the modulator.

21. A non-transitory computer-readable memory medium containing instructions for causing at least one processor to perform a method, the method comprising:
identifying a word in a set of words corresponding to a received coding value in a set of coding values, wherein the set of words includes at least one data word, at least one modulator command word and at least one gain command word, the at least one modulator command word including a command word for assigning a chosen working mode to at least one of a filter and a modulation device of a modulator;
when the received coding value corresponds to a data word, modulating the data word;
when the received coding value corresponds to a modulator command word, controlling a modulator based on the modulator command word; and
when the received coding value corresponds to a gain command word, controlling a gain of a modulated signal based on the gain command word.

22. The non-transitory computer-readable memory medium of claim 21 wherein the at least one modulator command word includes at least one mode command word and when the coding value corresponds to the at least one mode command word, the controlling the modulator comprises causing the modulator to enter a mode of operation.

23. The non-transitory computer-readable memory medium of claim 22 wherein the at least one mode command word in the set of words includes:
an initialization mode command word, wherein when the received coding value corresponds to the initialization mode command word, the controlling the modulator comprises pre-load a filter with a chosen sequence of rotated valid symbols for an immediate up-ramping of the modulator;
a reset mode command word, wherein when the received coding value corresponds to the reset mode command word, the controlling the modulator comprises forcing binary values of zero into the filter for an immediate down-ramping of the modulator; and
a force to zero mode command word, wherein when the received coding value corresponds to the force to zero mode command word, the controlling the modulator comprises forcing at least one binary value of zero into the modulator.

* * * * *

UNITED STATES PATENT AND TRADEMARK OFFICE
CERTIFICATE OF CORRECTION

PATENT NO. : 8,102,937 B2
APPLICATION NO. : 11/572911
DATED : January 24, 2012
INVENTOR(S) : Markus Helfenstein et al.

Page 1 of 1

It is certified that error appears in the above-identified patent and that said Letters Patent is hereby corrected as shown below:

Col. 7, line 49, please change "MX2;" to --MX2$_i$--.

Col. 8, line 22, please change "MP2," to --MP2$_1$--.

Col. 11, line 7, please change "expo(k-1)π/2)" to --exp(j(k-1)π/2)--.

Col. 11, line 34, please change "expo(k-1)π/2)" to --exp(j(k-1)π/2)--.

Signed and Sealed this
First Day of May, 2012

David J. Kappos
*Director of the United States Patent and Trademark Office*